May 27, 1924.　　　　　　　　　　　　　　　　1,495,719
G. H. WHITE
COATING MACHINE
Filed Feb. 20, 1922　　　　3 Sheets-Sheet 3
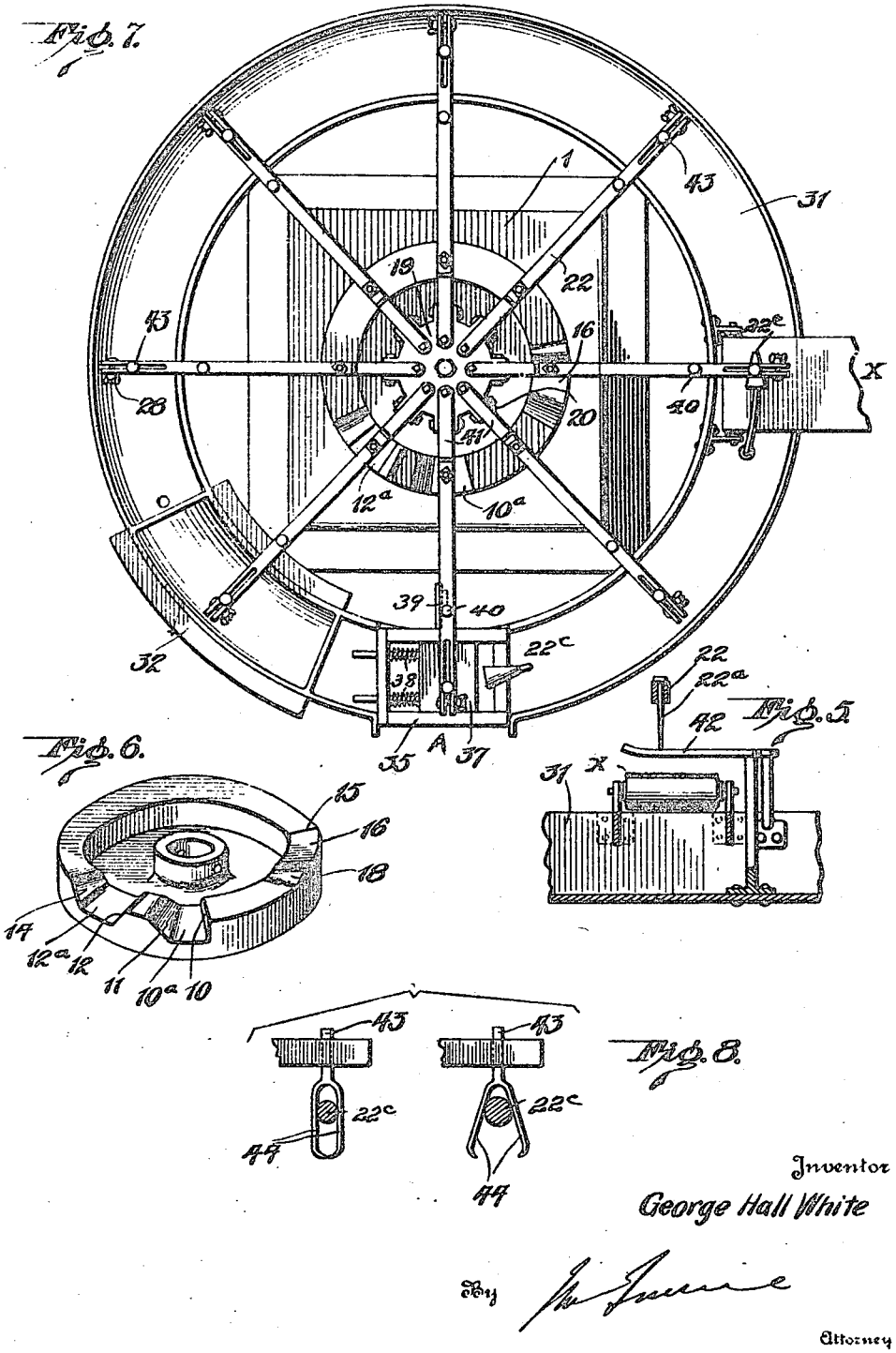
Inventor
George Hall White
Attorney Patented May 27, 1924.

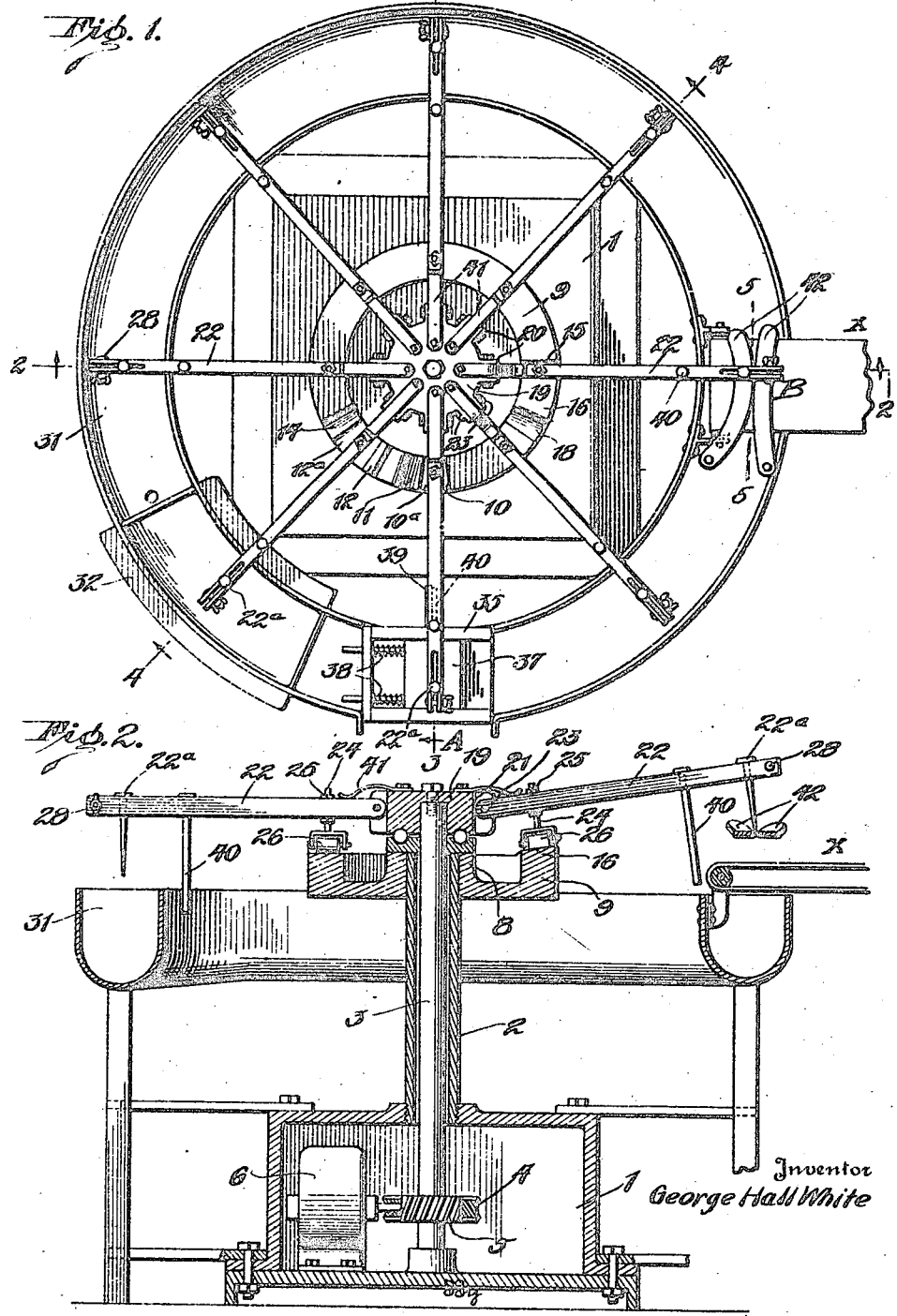

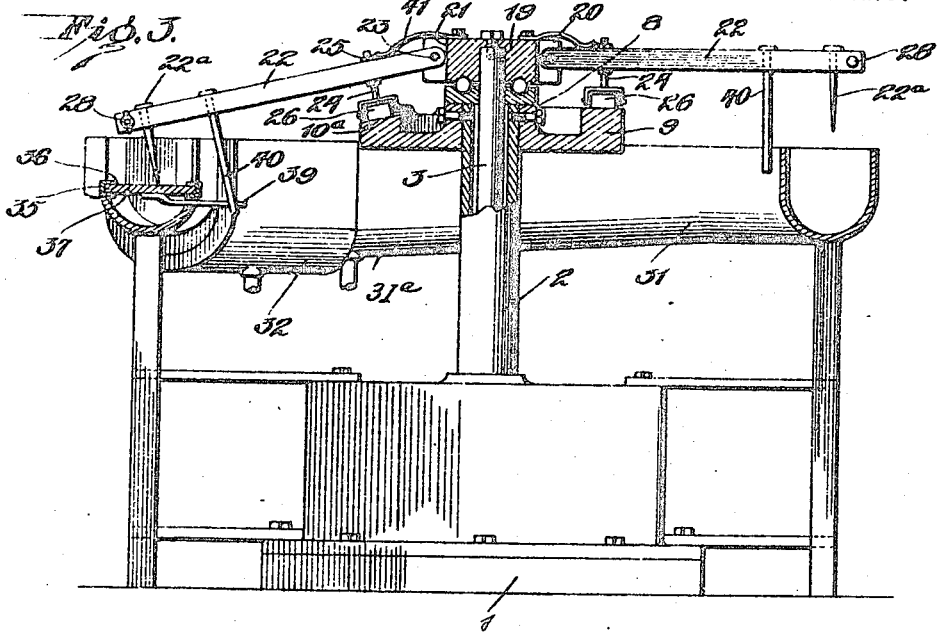
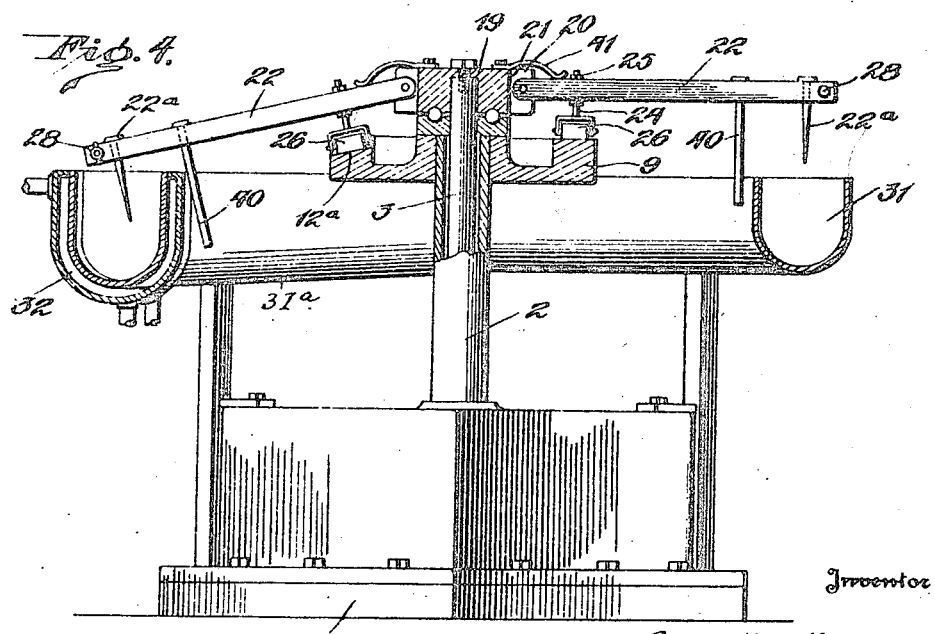

1,495,719

UNITED STATES PATENT OFFICE.

GEORGE HALL WHITE, OF WASHINGTON, DISTRICT OF COLUMBIA.

COATING MACHINE.

Application filed February 20, 1922. Serial No. 537,999.

*To all whom it may concern:*

Be it known that I, GEORGE HALL WHITE, a citizen of the United States of America, residing at Washington, in the District of Columbia, have invented certain new and useful Improvements in Coating Machines, of which the following is a specification.

This invention relates to improvements in machines designed primarily for dipping and handling bars of ice cream when coating the same with a confection.

In the manufacture of what is now popularly known as "Eskimo Pie," it is customary to dip each individual bar of ice cream by hand into a body of chocolate or like coating, and then manually and individually place each bar on a conveyer to be subsequently wrapped and stored.

The object of this invention is to dispense with the slow individual handling of the bars and provide mechanical means for automatically picking up a bar of ice cream, dipping the same into a pot of coating, removing the coated bar, allow the chocolate or like coating to cool, and subsequently automatically remove the coated bar to be carried away by a conveyer for subsequent wrapping and refrigeration.

A further object of the invention is to provide automatic mechanism for coating ice cream or other bars mechanically to increase production and improve the uniformity of the product.

The invention also comprehends improvements in the details of construction and arrangement of parts which will be hereinafter described and pointed out in the claims.

In the drawings:

Fig. 1 is a plan view.

Fig. 2 is a vertical section on the line 2—2 of Fig. 1.

Fig. 3 is a vertical section on the line 3—3 of Fig. 1.

Fig. 4 is a vertical section on the line 4—4 of Fig. 1.

Fig. 5 is a detail section on the line 5—5 of Fig. 1.

Fig. 6 is a detail perspective view of the cam track.

Fig. 7 is a plan view of a modified form of the invention.

Fig. 8 indicates the open and closed positions of the article-holding fingers shown in Fig. 7.

1 indicates a base or frame, and rising therefrom is a sleeve 2. Mounted in a bearing in the base or frame and extending thru the sleeve is a shaft 3, provided with a worm gear 4, which meshes with a worm 5, suitably connected to a motor indicated at 6. On the upper end of the sleeve is mounted a spider 8, which carries a track 9, provided with a series of cams. Track 9 is formed with a deep depression indicated at 10, from the wall of which extends a horizontal portion 10$^a$, and from this portion rises an inclined cam portion 11. Some distance from the cam portion 11 is an acute angular depression or cam drop 12, from which extends a horizontal portion 12$^a$, and from the latter portion extends an inclined cam surface 14. Some distance around the track is an upwardly inclined cam surface 15, to form an elevated track level 16, the opposite end of which inclines downwardly to provide a cam 18.

At the upper end of the shaft 3 is a spider casting 19, provided with a plurality of ears 20, open at the bottom, and outer portions to form a series of sockets 21, to receive arms 22, pivoted on pins 23 extending thru the sockets, and which radiate from the central shaft 3. Extending thru each arm 22, is a screw 24, locked in adjusted position by bolts 25, and at the lower end of each screw are ears to receive a roller 26, the rollers riding on the track 9. The outer end of each arm 22 is slit to receive a pin 22$^a$ preferably made of bamboo or like wood, or such pins may be made of metal if found desirable. In order to clamp the pins in the slits, each arm 22 is provided with a transversely arranged set screw and nut 28.

Supported on the base frame by standards is an annular gutter-like frame 31, having formed therein a chocolate or other confection melting pot, having heating means as at 32, to melt the material. The bottom of the gutter-like frame from the melting pot in one direction is inclined and may be heated, so that any material dropping from the bars after being dipped will melt and flow back to the pot.

In what may be termed the front of the machine, or at the initial point A of starting the operation of coating a bar, there is a platform comprising a stationary frame 35 having grooves 36 to receive a slide 37, between which and a cross bar on the frame extend guide pins and springs 38, the latter being adapted to be compressed to return the slide to an initial position during the operation of the machine. Extending from the slide is a pin 39, arranged in the path of a pin 40, depending from each arm 22 to afford convenient means for moving the slide and its load, and compressing the springs, as will hereinafter appear in the description of the operation of the mechanism.

In order that the rollers 26 of the arms 22 may be retained in contact with the track 9 and engage the cam surfaces, springs 41 are mounted on the frame or casting at the top of the shaft 3 and extend outwardly and engage the arms, as shown in the drawings.

Located conveniently above the gutter-like frame are spaced apart stripping fingers 42, designed to form a track, thru which the pins 22$^a$ pass, when the coated bar is being automatically disengaged from said pins. Directly under these stripping fingers is a conveyer X to receive the coated article, to be conveyed to a convenient place to be wrapped et cetera.

In lieu of the pins for picking up the bars, and to extend the use of the invention for handling other than ice cream bars, I may provide gripping elements, such as shown in Fig. 8. These elements each comprise a stem 43, formed at its lower end with a pair of depending spaced apart resilient fingers 44 having their lower ends turned inwardly to engage an article being handled. In order that these fingers may be opened and closed at the proper time to grip or release an article, two stationary cam members 22$^c$ are disposed between the arms 22 and the gutter-like frame. These cam members are in the form of a round wedge or cone, so disposed and arranged in the path of movement as to engage between the fingers so that when it is desired to open the fingers, the latter will engage the small end of the wedge, and as the arms 22 rotate, the wedge surfaces will spread said fingers as shown in Fig. 8.

In operation, assuming the parts to be in the position shown in Fig. 1, an operator places a bar of ice cream or the like on the slide 37 of the platform, and as the shaft 3 is in rotation and the cam depression 10 is so disposed with reference to the platform, the arm 22 at this time directly above the depression will drop, and the pin carried thereby will correspondingly drop and be driven into the bar of ice cream. At this time, the pin 40 on the arm will engage the pin 39, on the slide 37, and move same together with the bar of ice cream in unison with the arm 22, thereby compressing the springs 38. The tensioning of the springs by this action gradually decreases the movement of the slide 37, as compared with the movement of the arm 22, and because of the slide moving in a straight line and the arm 22 traveling in the arc of a circle and elevated by its cam, at about the time the springs are compressed, the two pins 39 and 40 will become disengaged and the springs will force the slide back to its normal position to receive the next succeeding bar of ice cream. The ice cream bar and arm 22 move together a distance equal to the length of the horizontal portion 10$^a$ of the depression 10, and then the article is gradually elevated from the slide to be carried to the chocolate pot. While the bar and the slide now separate, the latter may continue to move until the pins 39 and 40 separate. The purpose of this movement is to prevent the pin 22$^a$ pulling out of the ice cream when the continuously rotating arm is lowered. This however, is avoided as at the time of lowering the arm to engage the article, the latter is in movement thru the pins 39 and 40, with the result that there is no undue friction created between the pin 22$^a$ and body of cream. The ice cream bar is now carried and wholly supported by the pin 22$^a$ on the end of the arm 22, and is conveyed to a point above the chocolate pot in the trough, and as the cam depression 13 of the track 9 is positioned in radial alignment with the chocolate pot, the arm 22 will, because of the inclined surface 12, be gradually lowered, consequently the bar of ice cream will be dipped into the body of chocolate and moved horizontally therein, and then gradually elevated therefrom by the roller 26 traveling up the adjacent inclined surface 14. Continued rotation of the shaft 3 correspondingly moves the arm 22 away from the dipping point, and conveys the now elevated coated ice cream bar, and any dripping of chocolate is caught by the inclined bottom 31$^a$ of the trough and conveyed to the chocolate pot. From the time the coated bar is lifted from the chocolate pot, until it reaches a point close to the point of disengagement of the bar from the pin, the track is horizontal to convey the bar in a uniform circular path around the mechanism, which affords sufficient time for the air to cool and harden the coating of chocolate. When the coated ice cream bar reaches the point of disengagement from the arm 22, indicated at B, the pin 22$^a$ therein travels between the guide arms 42 and at about this time, the roller 26 of said arm engages the inclined cam surface 15 and lifts the arm on its pivot, and thereby the pin is disengaged from the coated bar, and the latter is allowed to drop onto a conveyer X where it is conveyed to operators for wrapping in paper or the like. When the pin is withdrawn from the bar, it engages the guide arms 42 and any accumulation of chocolate thereon will be scraped off.

When using the modified form of fingers shown in Fig. 8, one of the cone shape wedges is disposed adjacent the feeding point A, and another at the delivery point B. Consequently, when a bar is placed on the slide, the fingers straddle the wedge and in the movement of the arm, said fingers slip off the large end of the wedge and the inherent resiliency of the metal of the fingers causes them to close and grip the article. When the fingers reach the delivery point B, they engage the cone 22$^c$ adjacent thereto and spread apart, and thereby drop the article onto the conveyer.

From the foregoing description, it will be seen that an operator merely places successive bars of ice cream on the platform and as the arms rotate, they successively automatically pick up the bars and in like manner convey them to the chocolate pot and dip them in and out, and then carry them a sufficient distance thru the air to cool the coating, and finally deliver the coated bars to a conveyer. As the operation of the machine is continuous and successive, confections can be quickly and automatically coated, and all the articles will be uniform.

While I have specifically described the invention as used particularly for coating ice cream bars, it is in no way limited to this class of confections. It is evident that candy fruit or other articles of food can be coated with the same degree of convenience and speed.

What I claim is:

1. In a coating machine, a platform including a slide, an arm traveling above the platform and carrying an article engaging device, means for actuating the arm to cause the engaging device to engage an article on the slide, means to subsequently operate the arm to dip and coat the article, and means to remove the coated article from the engaging means.

2. In a coating machine, the combination of means for impaling an article to be coated, a pot adapted to contain a semi-fluid coating means to create relative movement between the article engaging means and the coating pot to coat the article with the semi-fluid coating, means for conveying the coated article from the coating pot, means for elevating the engaging means at a predetermined point in the path of travel thereof, and a member to hold the coated article against following such elevating movement of the engaging means, whereby the article is removed from the engaging means.

3. In a coating machine, the combination of a platform having a slide to receive an article to be coated, a pot adapted to contain a semi-fluid coating, a plurality of article engaging means traveling over the platform and pot, means for tilting the article engaging means to pick up an article from the slide and to dip said article in the pot, said engaging means compelling a limited movement of the slide immediately following the action of the engaging means to pick up the article, and means for removing the coated articles from the engaging means.

4. In a coating machine, the combination of a platform including a slide, springs placed under tension when the slide is moved in one direction and adapted to return the slide to normal position, an arm traveling above the platform and carrying an article engaging device, means for actuating the arm to cause the engaging device to engage an article on the slide, means between the arm and the slide to compress the spring and carry the engaged article with the arm, and to be disengaged to return to normal position and permit the article to be held by the engaging means, means to subsequently operate the arm to dip and coat the article, and means to remove the coated article from the engaging means.

5. In a coating machine, the combination of an article engaging means, a platform, means between the platform and the engaging means to cause the article to move a limited distance with the article engaging means and to be withdrawn from thereunder, a pot adapted to contain a semi-fluid coating, means for operating the engaging means to dip the article in the pot, and means for removing the coated article from the engaging means.

6. In a coating machine, the combination of a revoluble series of arms, each having an article engaging device near its outer end, an article receiving platform, a coating pot disposed some distance from the platform, and cams disposed to successively tilt the arms adjacent the platform to pick up an article therefrom and to thereafter tilt said arms when adjacent the coating pot to dip the articles, means to withdraw the article engaging device from the coated article at a predetermined point in the travel of the arms, and means to receive the drip from the article throughout the full course thereof from the coating pot to the discharge means.

7. In a coating machine, the combination with a rotatable arm provided at its outer end with an article engaging device, a platform having a slide spring actuated in one direction, means for actuating the article engaging means to engage an article on the slide, means for causing the slide to move in unison with the article engaging device at the time the latter is actuated, the actuating means being returned to normal position before movement of the slide ceases, and means for subsequently dipping the articles in a coating of confection.

8. In a coating machine, the combination of an article receiving platform, a coating pot, a vertical shaft, a plurality of arms hinged to the vertical shaft and having at their ends article engaging devices, means for rotating the shaft, an annular track under the arms, said track having a cam to cause the arms to rock when adjacent the platform, a cam to cause the arms to rock adjacent the coating pot, and a cam to elevate the arms to disengage the engaging device and release the coated article.

In testimony whereof I affix my signature.

GEORGE HALL WHITE.